United States Patent
Morozumi

(10) Patent No.: US 6,663,819 B2
(45) Date of Patent: Dec. 16, 2003

(54) CONDUCTIVE PLATE MOLDING METHOD

(75) Inventor: Eiichiro Morozumi, Toyota (JP)

(73) Assignee: Araco Kabushiki Kaisha, Toyota (JP)

( * ) Notice: Subject to any disclaimer, the term of this patent is extended or adjusted under 35 U.S.C. 154(b) by 59 days.

(21) Appl. No.: 09/989,400

(22) Filed: Nov. 21, 2001

(65) Prior Publication Data

US 2003/0094726 A1 May 22, 2003

(51) Int. Cl.[7] .................. B29B 11/12; B29B 11/14; B29B 15/10
(52) U.S. Cl. .............. 264/460; 264/126; 264/251; 264/260; 264/267; 264/273; 264/430
(58) Field of Search .................. 264/251, 260, 264/267, 273, 460, 430, 109–128

(56) References Cited

U.S. PATENT DOCUMENTS 4,055,526 A  * 10/1977  Kiyokawa et al. .......... 264/470
4,775,500 A  * 10/1988  Funakoshi et al. .......... 264/461

FOREIGN PATENT DOCUMENTS

| EP | 1 061 598 A1 | 12/2000 |
| EP | 1 078 725 A2 | 2/2001 |
| EP | 1 083 034 A2 | 3/2001 |
| JP | A 60-246568 | 12/1985 |
| JP | A 5-74469 | 3/1993 |
| JP | A 10-3931 | 1/1998 |
| JP | A 11-195422 | 7/1999 |
| WO | WO 00/39872 | 7/2000 |

* cited by examiner

Primary Examiner—Stephen J. Lechert, Jr.
(74) Attorney, Agent, or Firm—Oliff & Berridge, PLC

(57) ABSTRACT

According to a molding method for a conductive plate of this invention, a substrate having through holes each corresponding to each protruded portion is employed and the substrate is sandwiched between both dies. Then raw powder is filled into each housing portion provided opposing each through hole in the substrate provided in each of both dies, through the through hole in order to form each protruded portion. Then the protruded portion is formed integrally with the substrate by heating the raw powder under pressure.

10 Claims, 11 Drawing Sheets

CONDUCTIVE PLATE MOLDING METHOD

BACKGORUND OF THE INVENTION

1. Field of the Invention

The invention relates to a molding method for various conductive plates such as the separator for a fuel cell and a molding apparatus for the same.

2. Description of the Related Art

One type of the separators for the fuel cell, as an example of the separator, includes a plurality of carbon rods implanted in the substrate made of synthetic resin as protruded portions, as disclosed in Japanese Patent Application Laid-Open No. 5-74469. In order to form that separator, a substrate made of synthetic resin and a plurality of carbon rods formed of carbon powder or the like are prepared and then, these carbon rods are installed in mounting holes made in the substrate. That is, the separator is formed by assembling the carbon rods and the substrate integrally with each other.

SUMMARY OF THE INVENTION

The invention relates to a molding method for molding the conductive plate having a plurality of protruded portions which are protruded in a single side or both sides of the substrate and a molding apparatus.

In the molding method for the conductive plate according to a first aspect of the invention, the substrate having the through holes at positions corresponding to the protruded portions is employed and the same substrate is sandwiched between both dies. Then, raw powder is filled into the respective housing portions provided opposing the respective through holes in the substrate through the through holes in order to form the protruded portions and then, by heating the raw powder under pressure, the protruded portions are formed integrally with the substrate.

In the molding method according to the first aspect of the invention, the respective protruded portions can be formed integrally with the substrate by heating the raw powder filled in each housing portion in each of both dies under pressure. Therefore, when forming the conductive plate of this type, it is not necessary to prepare the protruded portions independently, thereby making it possible to abolish the work for forming the protruded portions separately. Further, the work for fitting the separately formed respective protruded portions into the through holes can be abolished. Consequently, this type of the conductive plate can be formed efficiently in a short time and at a low cost.

A substrate made of synthetic resin may be employed as the substrate and the raw powder in which carbon powder is mixed with binder resin may also be employed. Further, thermosetting resin may be employed as the binder resin. Consequently, this type of the conductive plate, particularly, a preferable separator for the fuel cell can be produced.

The molding method according to the first aspect of the invention may be constructed such that by supplying a power to the raw powder filled in each housing portion in both dies, the raw powder is heated with heat generated by resistance. In this case, it is desirable to supply power to the raw powder filled in each housing portion in both dies.

With this structure, time required for heating the raw powder filled in each housing portion can be reduced largely, thereby leading to a large reduction of total processing time for the conductive plate. Further if the raw powder filled in the respective housing portions is supplied with power in series connection, current is applied to the raw powder in each housing portion equally and rapidly. Consequently, the respective portions of the raw powder can be heated efficiently with heat generated by resistance.

Further, in the first aspect of the invention, it is permissible to employ a mold having an opening with a diameter slightly larger than the through hole of each housing portion in the substrate to be filled with the raw powder.

In this case, when the raw powder filled in each housing portion is heated under pressure, part of the raw powder flows out around the periphery of the opening of each through hole in the substrate and hardens. As a result, joint area of the protruded portion to the substrate is increased so that the joint strength at each protruded portion is improved and at the same time, air-tightness between each protruded portion and each through hole in the substrate is also intensified. As a result, gas sealability between the protruded portion and the through hole in the substrate is improved.

The molding apparatus for the conductive plate according to a second aspect of the invention includes molds, a filler for filling the molds with the raw powder, a heating device for heating the raw powder and punches for forming the raw powder with pressure. The substrate having the through holes provided at predetermined positions is prepared and the mold contains the housing portions each having an opening corresponding to the through hole in the substrate. The substrate is sandwiched such that the housing portion corresponds to the through hole in the substrate. The filler fills the housing portion with the raw powder through the through hole. The heating device heats the raw powder filled in the housing portion through the through hole. The punches are slidably disposed so as to form the raw powder filled in the housing portion through the through hole with pressure.

The molding apparatus according to the second aspect of the invention can form the respective protruded portions integrally with the substrate by heating the raw powder filled in each housing portion in both dies under pressure. For that reason, when the conductive plate of this type is formed, it is not necessary to prepare the protruded portions preliminarily, so that the work for molding the protruded portions independently can be abolished. Further, it is also possible to abolish the work for fitting the independently formed protruded portions in the through holes in the substrate. As a result, this type of the conductive plate can be formed efficiently in a short time and at a low cost.

In the molding method for the conductive plate according to a third aspect of the invention, a mold is filled with raw powder comprising a mixture of conductive powder with binder resin. Then, current is supplied to raw powder filled in the mold so as to heat the raw powder with heat generated by resistance of raw powder, and then, the raw power heated in said mold is pressureized so as to form said conductive plate.

DETAILED DESCRIPTION OF THE PREFERRED EMBODIMENTS

Figure 1:
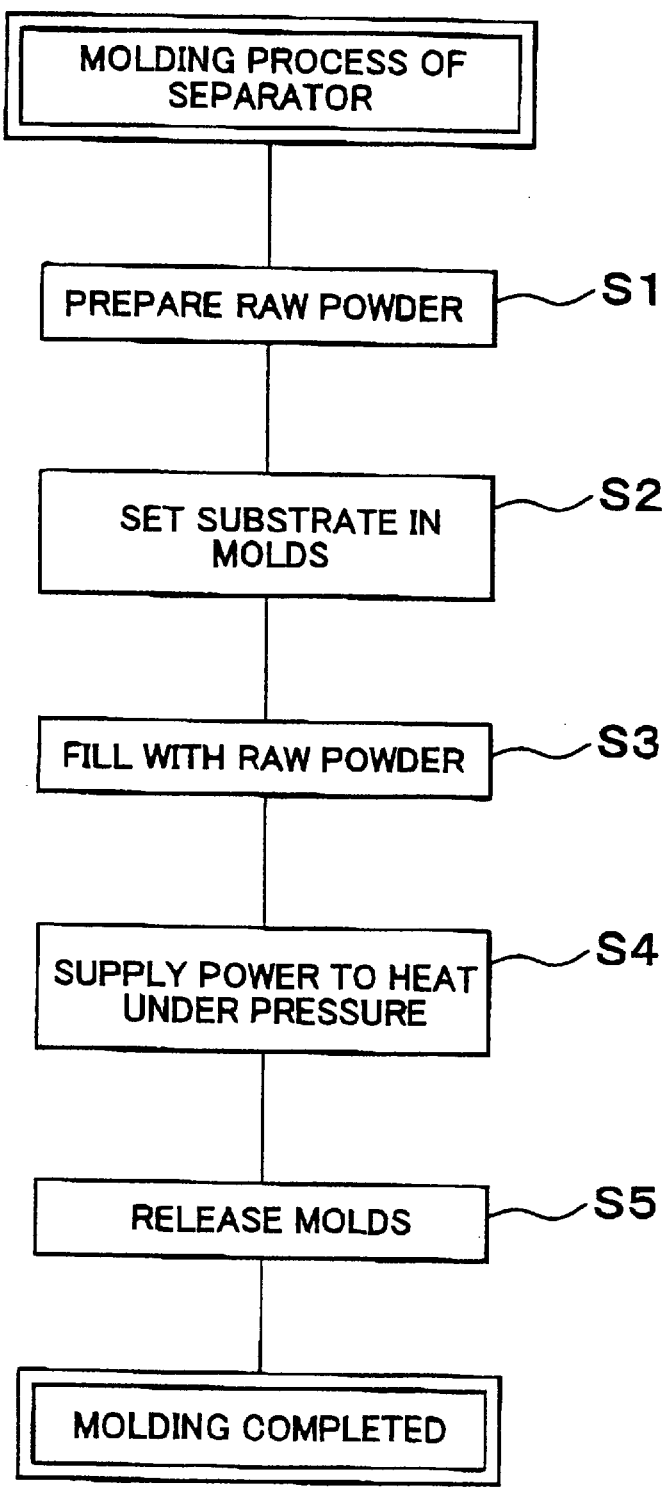
FIG. 1 is a flow chart showing processing steps based on a molding method according to an example of the invention.

According to a processing method for a separator of a fuel cell according to an example of the invention, as shown in the processing diagram of FIG. 1, raw powder is prepared in step 1, and set up in a mold for a substrate in step 2. In step 3, the raw powder is filled into the mold (the mold is filled with the raw powder), and heated under pressure by supplying electricity in step 4 and finally, a molded product is taken out of the mold in step 5.

According to the same processing method, the raw powder is prepared by mixing carbon powder with binder resin so as to mold a separator. According to this processing method, protruded portions integral with the substrate are formed by molding by heating the raw powder under pressure. Here, the selected carbon powder should have a high purity of for example 99% and an average grain diameter of several $\mu$m to several tens $\mu$m. Although binder resin, which should be mixed, may be either thermosetting resin or thermoplastic resin, if considering the quality of the separator, the thermosetting resin is preferable. When the thermosetting resin is heated at a predetermined temperature, it performs a thermosetting reaction to bond particles of carbon powder together. The thermosetting resin for use for this purpose includes phenol resin, epoxy resin, urea resin, unsaturated polyester resin, alkyd resin and the like.

In preparation of the raw powder, 10–25 parts by weight of the binder resin is mixed with 100 parts by weight of the carbon powder. For mixing binder resin, the binder resin is dissolved with volatile organic solvent into a solution and this solution is added to the carbon powder and agitated sufficiently. The obtained substance after the agitation is dried to remove volatile components and then crushed. The crushed substance is sifted through a sieve to particle diameter of for example 2 mm or smaller to obtain the raw powder.

The substrate is made of synthetic resin having an insulating property and formed with through holes at positions in which each protruded portion should be implanted. The respective through holes are formed so as to oppose respective housing portions possessed by upper and lower dies. Upon setting the substrate on a mold, the substrate is disposed between the upper and lower dies and sandwiched by both upper and lower dies so that the respective through holes oppose opening portions of the respective housing portions. Then, after the substrate is set up in such a manner, the raw powder prepared in the above-described manner is loaded into the respective housing portions in the mold so that the housing portions are filled therewith.

Upon filling the respective housing portions of both dies with the raw powder, the raw powder is loaded into the housing portions in both upper and lower dies sandwiching the substrate. The housing portions in the lower die is filled through the through holes in the substrate from the housing portions in the upper die, and after that, the housing portions in the upper die is also filled therewith. In this mold, the raw powder filled in each housing portion of both upper and lower dies can be heated under pressure through each protruded portion in cooperative action by both dies. In this case, a mold capable of supplying electricity to the raw powder filled in each housing portion upon molding with pressure is selected. Upon molding with pressure, electricity is supplied with a constant current of several ampere to several tens amperes/cm$^2$ per unit area for several seconds to several tens seconds.

By supplying electricity, the raw powder filled in each housing portion is heated with heat generated by resistance. After confirming that the raw powder reaches a thermosetting temperature of the binder resin, for example, around 200° C., supplying electricity is stopped. During this period or after this, the raw powder is pressurized to be formed into the shape of a separator. It takes within 1 minute to complete the molding after the raw powder is filled in each housing portion of both dies and after the molding is completed, the separator is released from the dies. According to this molding method, if current is supplied to the raw powder filled in the respective housing portions in series connection, current can be applied equally to all the raw powder in the respective housing portions rapidly, so that the raw powder filled in the respective housing portions can be heated efficiently with heat generated by resistance.

As the mold for both upper and lower dies, if a mold in which the diameter of the opening of each housing portion thereof filled with the raw powder is slightly larger than the through hole in the substrate is selected, when heating the raw powder filled in each housing portion under pressure, part of the raw powder flows out of the through hole around each opening in the substrate so that it is solidified. For this reason, in a separator formed in this way, an joint area of each protruded portion to the substrate is increased so that the joint strength of each protruded portion is intensified and air tightness between each protruded portion and each through hole in the substrate is also intensified. Consequently, gas sealability between each protruded portion and each through hole in the substrate is improved thereby providing a separator of high quality.

Figure 2A:
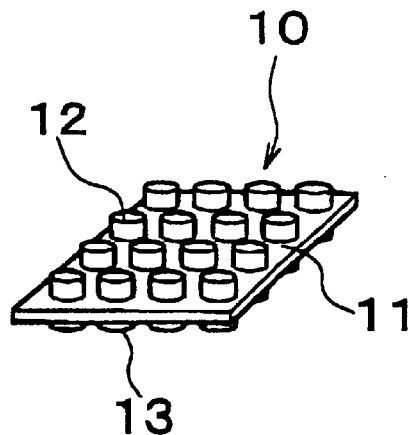
FIG. 2A is a perspective view showing an appearance of the separator to be molded by the same processing method and FIG. 2B is a plan view of a substrate constituting the separator.
Figure 2B:
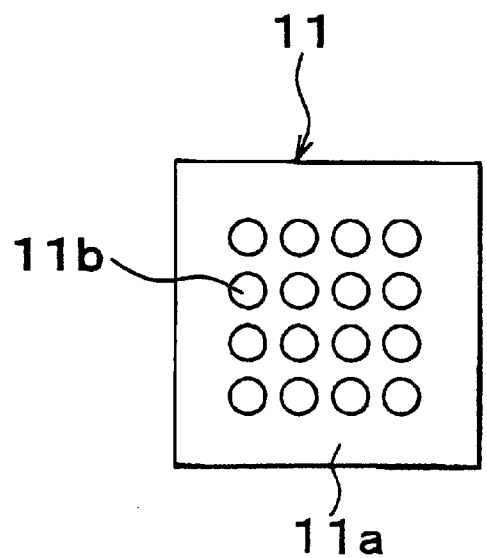
Figure 3:
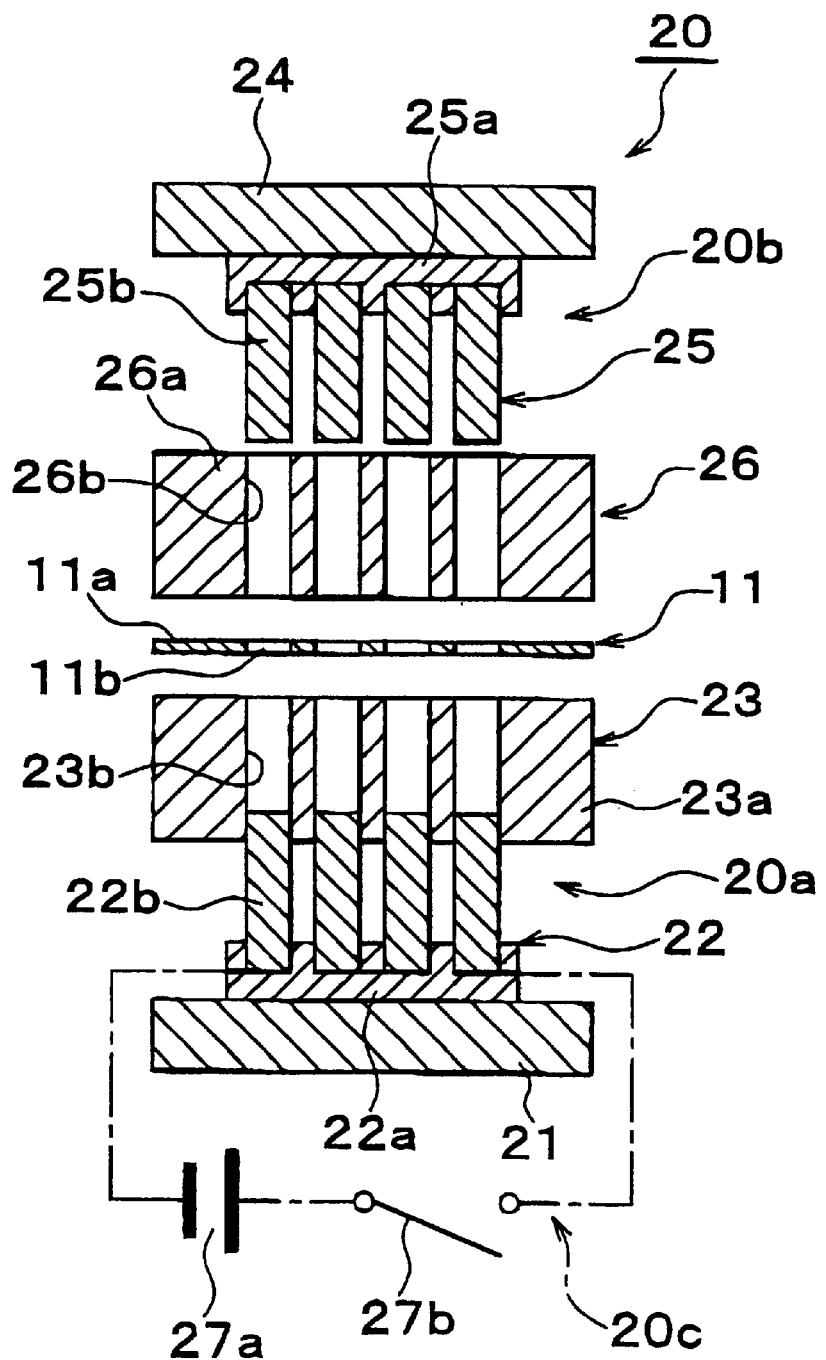
FIG. 3 is a schematic longitudinal sectional view of a mold for carrying out the same processing method when it is not activated.

According to this embodiment, a separator 10 shown in FIG. 2A is formed with a substrate 11 shown in FIG. 2B by means of a mold 20 shown in FIG. 3. FIGS. 3–6 show operating conditions of the mold 20 in each step. The separator 10 is produced by molding the raw powder, which is a mixture of carbon powder and phenol resin acting as binder resin, by heating under pressure. The separator has a flat substrate 11 of a predetermined size and a plurality of cylindrical protruded portions 12, 13 protruded from both the right and left faces of the substrate 11. The substrate 11 has a plurality of through holes 11b in a plate main body 11a thereof. The mold 20 is provided with a lower die structure 20a and an upper die structure 20b and provided with a power supplying circuit 20c for connecting the lower die structure 20a with the upper die structure 20b.

The lower die structure 20a is constituted by a lower die punch 22 provided on a press platen 21 and a lower die 23, while the upper die structure 20b comprises an upper die punch 25 provided on a press platen 24 and an upper die 26. The respective press platens 21, 24 are formed of metallic metal such as steel.

The lower die punch 22 and the upper die punch 25 are constructed by each of holder portions 22a, 25a and plural punch portions 22b, 25b. The punch portions 22b of the lower die punch 22 are inserted into the through holes 23b provided in a die main body 23a of the lower die 23 such that they are slidable with respect to the lower die 23, so that the respective through holes 23b in the lower die 23 serve as a plurality of the housing portions filled with the raw powder. The punch portion 25b of the upper die punch 25 are positioned to oppose the respective through holes 26b provided in the die main body 26a of the upper die 26 and inserted into the through holes 26b in the upper die 26 such that they are slidable with respect to the through holes 26b. The through holes 26b in the upper die 26 oppose the through holes 23b in the lower die 23 so as to form a plurality of the housing portions filled with the raw powder with the through holes 23b. The raw powder to be filled in the housing portions is stored in a tank 28.

A power supplying circuit 20c is provided with a power supply 27a and an operating switch 27b. One end of the power supplying circuit 20c is connected to one of punch portions 22b of the lower die punch 22 while the other end thereof is connected to the other one of the punch portion 22b of the lower die punch 22. In the lower die punch 22, the respective punch portions 22b are electrically connected in a predetermined relationship and further, in the upper die punch 25, the respective punch portions 25b are electrically connected in a predetermined relationship. The electrical relation of the punch portions 22b, 25b allows all the raw powder filled in all the housing portions to be supplied with electricity in series connection between all punch portions 22b and 25b opposing each other, so that current is applied to the raw powder filled in the respective housing portions in the mold 20 in series.

In the lower die structures 20a and the upper die structure 20b, the holder portions 22a, 25a for the respective punches 22, 25 are formed of insulating material to prevent a short-circuit between the adjacent punch portions 22b and 25b. However, in order to form series connection between punch portions 22b and 25b opposing each other as explained above, the respective punch portions 22b are electrically connected in a predetermined relationship by conductive lines as not shown in FIG. 3 and further, the respective punch portions 25b are electrically connected in a predetermined relationship by conductive lines as not shown in FIG. 3. AS the material to be formed into the holder portions, phenol resin, glass fiber reinforced epoxy resin, insulating ceramic and the like can be mentioned. The respective punch portions 22b, 25b are formed of conductive material such as copper, steel and the like. As the material to be formed, a material having a low volume inherent resistance is preferable. The respective punch portions 22b, 25b are sure to make a contact with the raw powder and the protruded portions formed thereof and therefore, in order to protect the punch portions 22b, 25b from sticking to the protruded portions, it is preferable that the surface of each of the punch portions 22b, 25b is coated with chrome or the like.

In the lower die structure 20a and the upper die structure 20b, the lower die 23 and the upper die 26 are made of insulating material like the holder portions 22a, 25a of the punches 22, 25 in order to prevent a short-circuit between the adjacent punch portions 22b and 25b of the punches 22, 25. As the material to be formed, phenol resin, glass fiber reinforced epoxy resin, insulating ceramic and the like can be mentioned.

Figure 4:
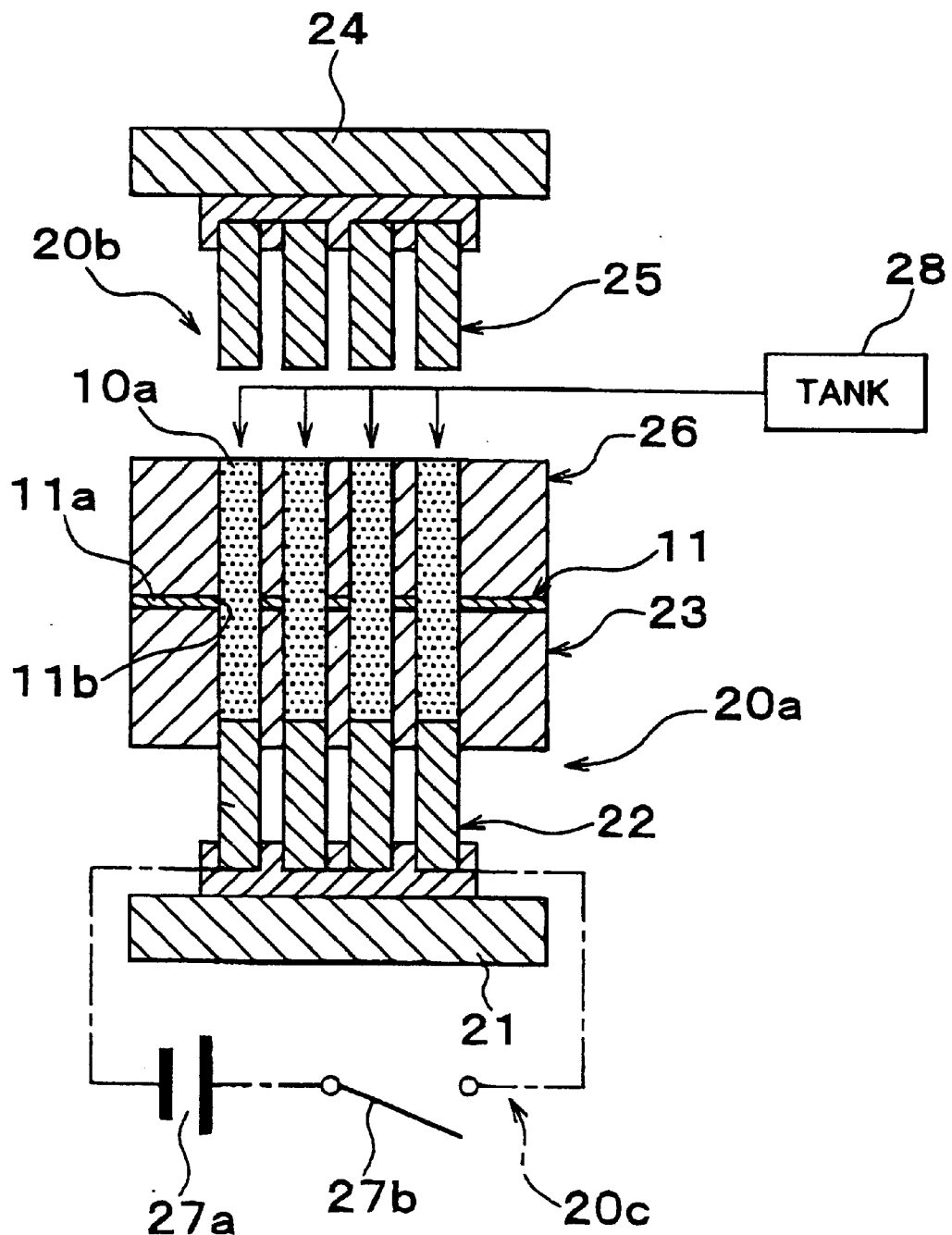
FIG. 4 is a schematic longitudinal sectional view showing a condition in which the mold is filled with raw powder.

According to the first embodiment of the invention, prior to filling the housing portions of the mold 20 with prepared raw powder, the substrate 11 is disposed between the lower die 23 and the upper die 26 as shown in FIG. 3 and then, the upper die 26 is descended to sandwich the substrate 11 with the lower die 23. With this condition, the raw powder stored in the tank 28 is thrown into the respective through holes 23b in the lower die 23 via the through holes 11b in the substrate 11 from the through holes 26b in the upper die 26, so that the raw powder 10a is filled in the respective through holes 23b in the lower die 23, the through holes 11b in the substrate 11 and the through holes 26b in the upper die 26, as shown in FIG. 4.

Next, the upper die 26 and the upper die punch 25 are descended to insert the punch portions 25 of the upper punch 25 into the through holes 26b in the upper die 26, thereby pressurizing the raw powder 10a filled in the through holes 26b. In this case, at the first stage, a preliminary pressurization without supplying electricity is carried out to compress the raw powder up to about twice or four times the volume of the separator 10. After that, the operating switch 27b of the power supplying circuit 20c is closed to supply a current to the respective portions of the raw powder 10a filled in the mold 20 in series connection.

Figure 5:
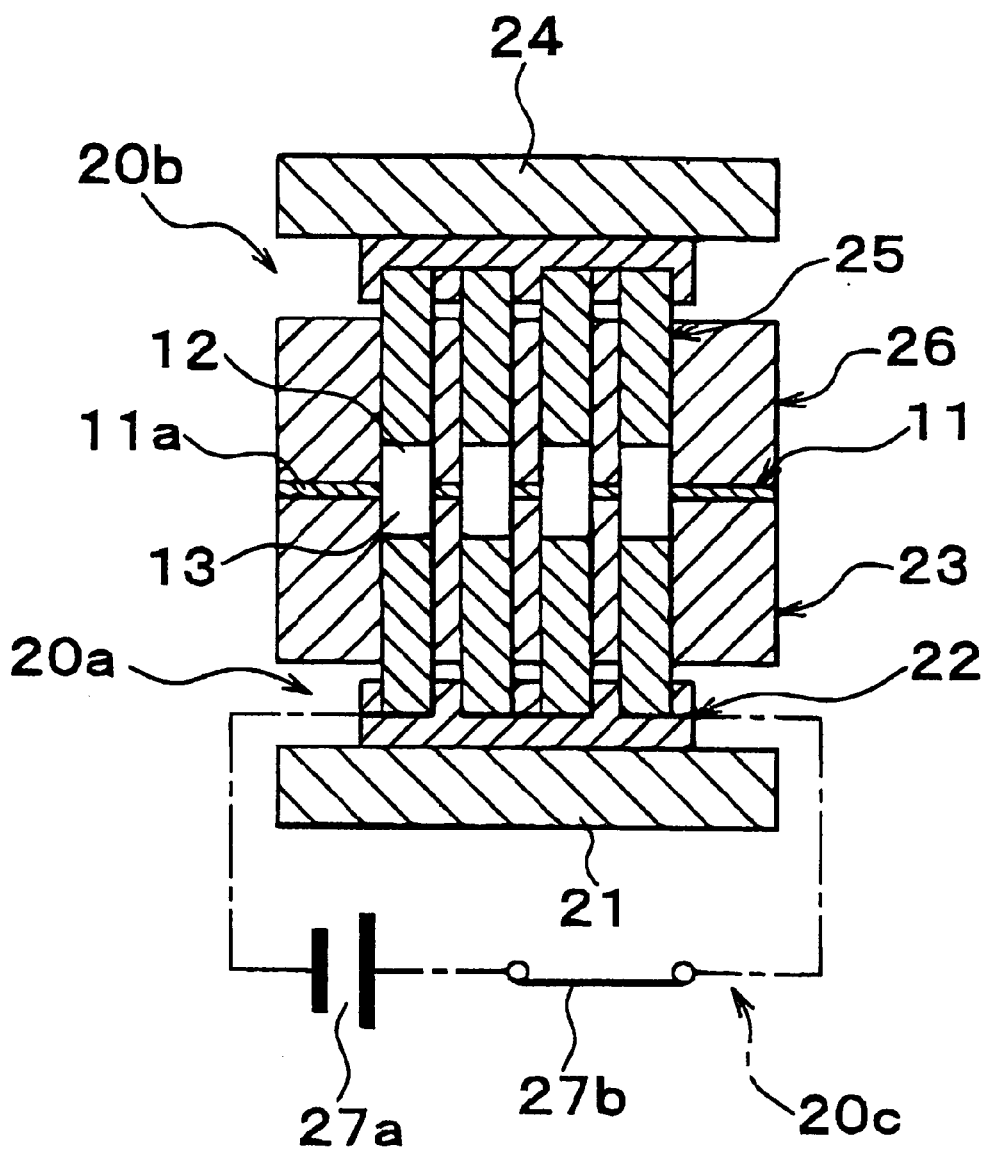
FIG. 5 is a schematic longitudinal sectional view showing a condition in which molding is completed with the same mold.

Current from the power supply 27a is supplied from one punch portion 22b in the lower die punch 22 of the mold 20 to one opposing punch portion 25b in the upper die punch 25 via the raw powder 10a. Then, this current is supplied from one adjacent punch portion 25b on the upper die punch 25 to one opposing punch portion 23b of the lower die punch 23 via the raw powder 10a. By repeating this power supplying action in succession, the current is supplied to the raw powder 10a in series relation, so that the current is applied thereto equally. FIG. 5 shows a condition in which current is supplied to the raw powder 10a.

Figure 6:
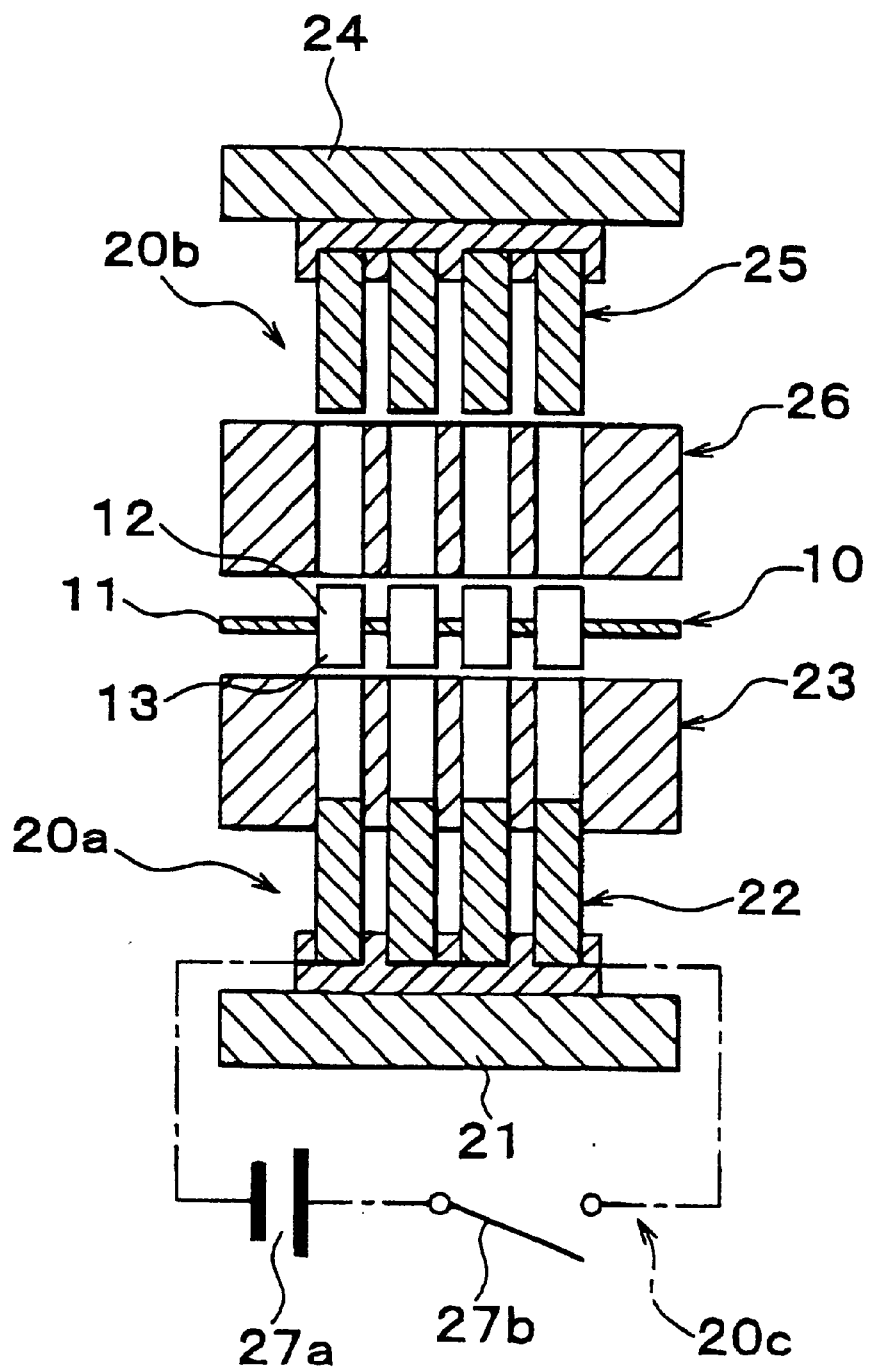
FIG. 6 is a schematic longitudinal sectional view showing a condition in which the separator of the same mold is released.

Consequently, Joule heat is generated by electric resistance in each raw powder 10a filled in the housing portion so that the raw powder 10a is heated up to a temperature allowing the binder resin to perform a thermosetting reaction. After confirming that each raw powder 10a reaches a thermosetting temperature of the binder resin, supplying electric power is stopped. Meanwhile, upon supplying power, constant current of about 40 A/cm$^2$ per unit area is applied for 20 seconds. As a result, the raw powder 10a is heated to about 200° C. After that, by applying a pressure to the raw powder 10a again, molding with pressure is completed. After the molding is completed, the upper die 26 and the upper die punch 25 are ascended up to its top dead center and the formed separator 10 is released. FIG. 6 shows a condition in which the separator 10 is released.

Although according to the second embodiment of the invention, basically the same processing method is applied as the first embodiment, heating of and pressurization to each raw powder 10a filled in each housing portion of the mold 20 are carried out at the same time. That is, after the raw powder 10a is loaded into the mold 20 with a condition shown in FIG. 4 and filled therein, the upper die 26 and the upper die punch 25 are descended to bring the punch portions 25b of the upper die punch 25 into the through holes 26b in the upper die 26, thereby applying a pressure to the filled raw powder 10a. At the same time, current is applied to the respective portions of the raw powder 10a in series so as to allow the binder resin to perform a thermosetting reaction. During this period, the upper die 26 and the upper die punch 25 are further descended up to the bottom dead center as shown in FIG. 5. As a result, the respective portions of the raw material 10a are formed with pressure all at once to form the separator 10.

According to the processing method, although there is an advantage that the molding with pressure can be achieved through a single stage, a large current is needed to heat each raw powder 10a up to a predetermined temperature because the electric resistance of the raw powder 10a decreases depending on the degree of the compression.

Although the third embodiment of the invention employs basically the same processing method as the first embodiment, each raw powder filled in the housing portion of the mold 20 is pressurized temporarily and after that, heated. That is, after filling the raw powder 10a in the mold 20 into the filling condition shown in FIG. 4, the upper die 26 and the upper die punch 25 are descended to allow the punch portions 25b of the upper die punch 25 to invade into the through holes 26b in the upper die 26. Consequently, the raw powder 10a filled therein is pressurized up to a final stage and after that, a current is applied to the respective portions of the raw powder 10a in series and heated, so that the binder resin is hardened by heat thereby completing the molding with pressure.

Although this processing method has such an advantage that the molding with pressure can be achieved through a single stage, a larger current than the second embodiment is required to heat the raw powder 10a to a predetermined temperature, because the electric resistance inherent of the raw powder 10a decreases depending on the degree of the compression.

Figure 7A:
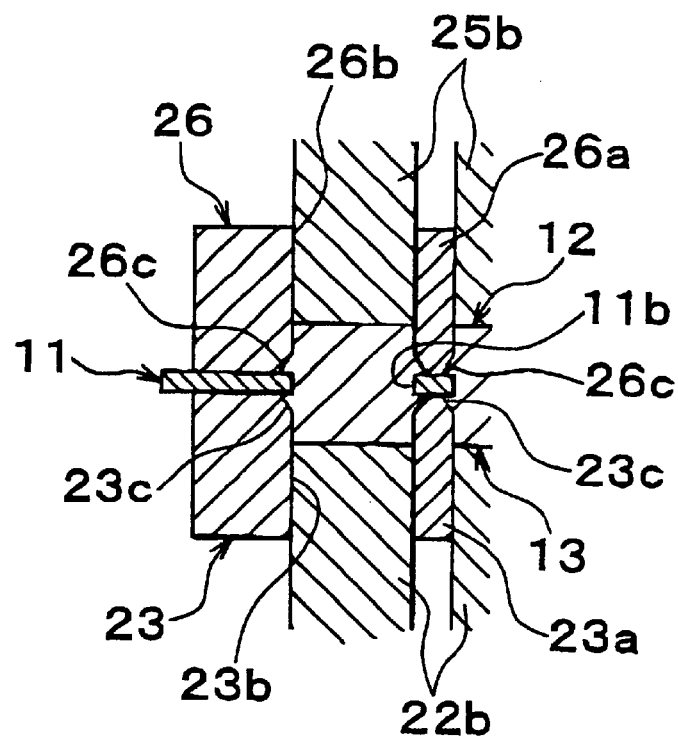
FIG. 7A is a partially enlarged longitudinal sectional view showing essential portions of a modified type of the same mold and FIG. 7B is a partially enlarged longitudinal sectional view showing essential portions of a separator molded with the same mold.

Although the fourth embodiment of the invention employs the same processing method as the first embodiment, it employs a mold, which is a slight improvement of the mold 20. Although the structure of this mold is completely the same as the mold 20, the peripheral portion of each opening of the through holes 23b, 26b in the lower die 23 and the upper die 26 respectively with the through hole 11b in the substrate 11 is formed in the form of tapered faces 23c, 26c as shown in FIG. 7A. That is, the opening opposing the through hole 11b in the substrate 11 of each housing portion filled with the raw powder 10a in the lower die 23 and the upper die 26 is formed slightly larger than the through hole 11b.

Figure 7B:
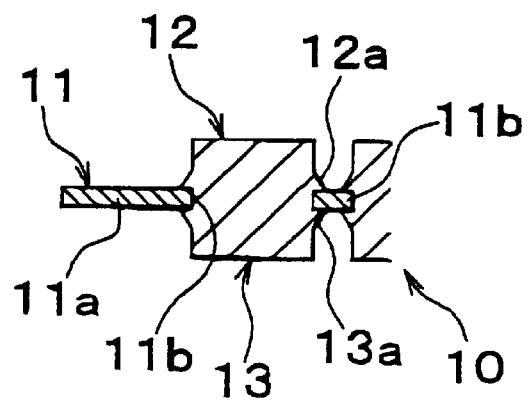

According to this embodiment employing this improved mold, when the raw powder 10a accommodated in the housing portion is heated under pressure, part of the raw powder 10a flows out around the peripheral portion of the opening of each through hole 11b in the substrate 11 so that it is hardened. Thus, in each separator, joint portions 12a, 13a to the substrate 11 of respective protruded portions 12, 13 expand as shown in FIG. 7b so as to increase joint area. Consequently, the joint strength of the respective protruded portions 12, 13 is improved and air-tightness between the respective protruded portions 12, 13 and the through holes 11b in the substrate 11 is intensified, so that gas sealability between the protruded portions 12, 13 and the through holes 11b in the substrate 11 is also improved, thereby securing high quality.

According to the first to fourth embodiments, after setting the substrate of the separator in a mold and filling the mold with the raw powder, the raw powder is heated under pressure so as to form the respective protruded portions integrally with the substrate. According to the fifth embodiment, different from these first to fourth embodiments, after filling the mold with the raw powder, the raw powder is heated under pressure so as to form the substrate having a plurality of protruded portions as a separator.

According to the fifth embodiment, a mold 30 is provided with a lower die 31 and lower die punch 32 made of conductive material such as metal, an upper die 33 and upper mold punch 34 made of conductive material such as metal, a frame body 35 made of insulating material such as resin, ceramic and a power supplying circuit 36. The lower die punch 32 has a plurality of rod portions 32b on an upper face side of a base plate 32a and these rod portions 32b are inserted into the through holes 31b provided in a main body 31a of the lower die 31, so that they slide to advance or retreat relative to the lower die 31. The frame body 35 is an annular shape and fitted into an upper edge portion of the lower die 31 so as to form an housing portion 37 for accommodating the raw powder 10a with the lower die 31 and the lower die punch 32.

An upper die punch 34 has a plurality of rod portions 34b on a lower face side of a substrate 34a, which are inserted into a plurality of through holes 33b provided in a die main body 33a of the upper die 33, so that the rod portions 34b advance or retreat relative to the upper die 33. The upper die 33 advances or retreats relative to the lower die 31 together with the upper die punch 34. If the upper die 33 advances to the lower die 31, it fits within the frame body 35 so that it faces an housing portion 37. If the upper die 33 retreats with respect to the lower die 31, it leaves the frame body 35. Both the upper die 33 and the upper die punch 34 shown in FIG. 8 are positioned at the top dead center.

In the mold 30, a power supplying circuit 36 is connected between a lower die punch 32 and an upper die punch 34. The power supplying circuit 36 is provided with a power supply 36a and an operating switch 36b and if the operating switch 36b is closed, a current is supplied to the raw powder 10a filled in the housing portion 37.

Figure 8:
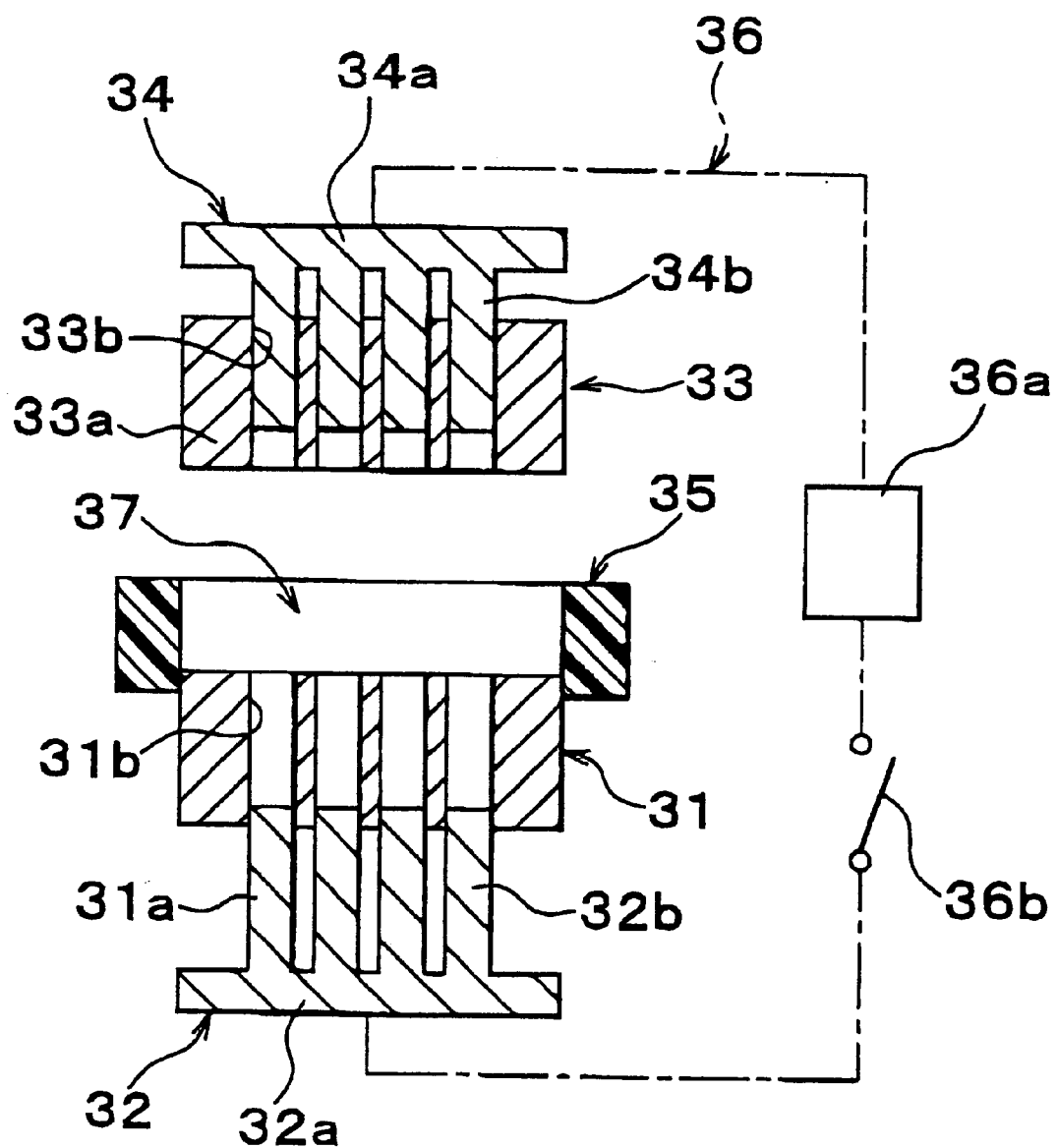
FIG. 8 is a schematic longitudinal sectional view showing a mold for carrying out another processing method when it is not activated.
Figure 9:
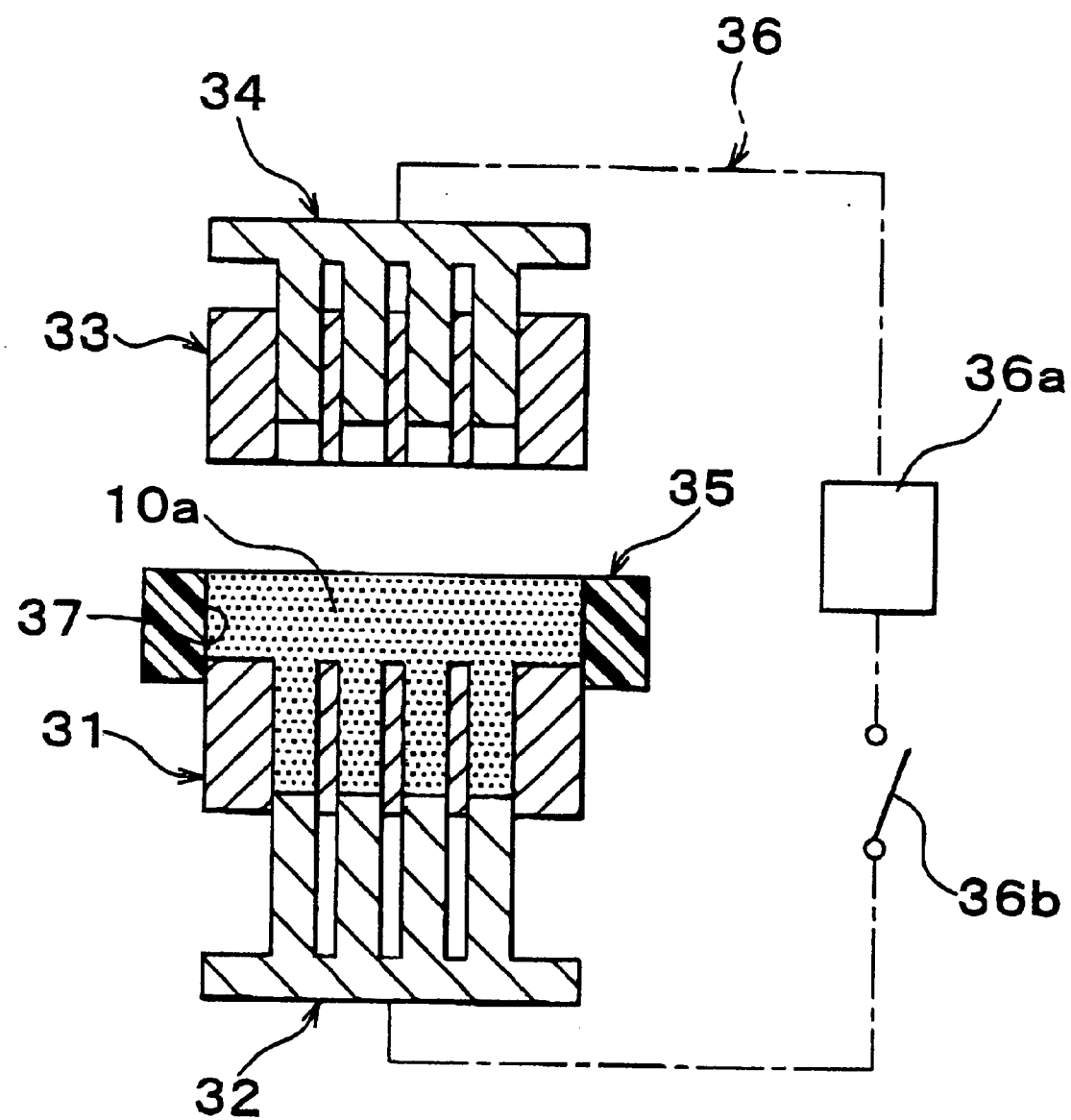
FIG. 9 is a schematic longitudinal sectional view showing a condition in which the mold is filled with raw powder.
Figure 10:
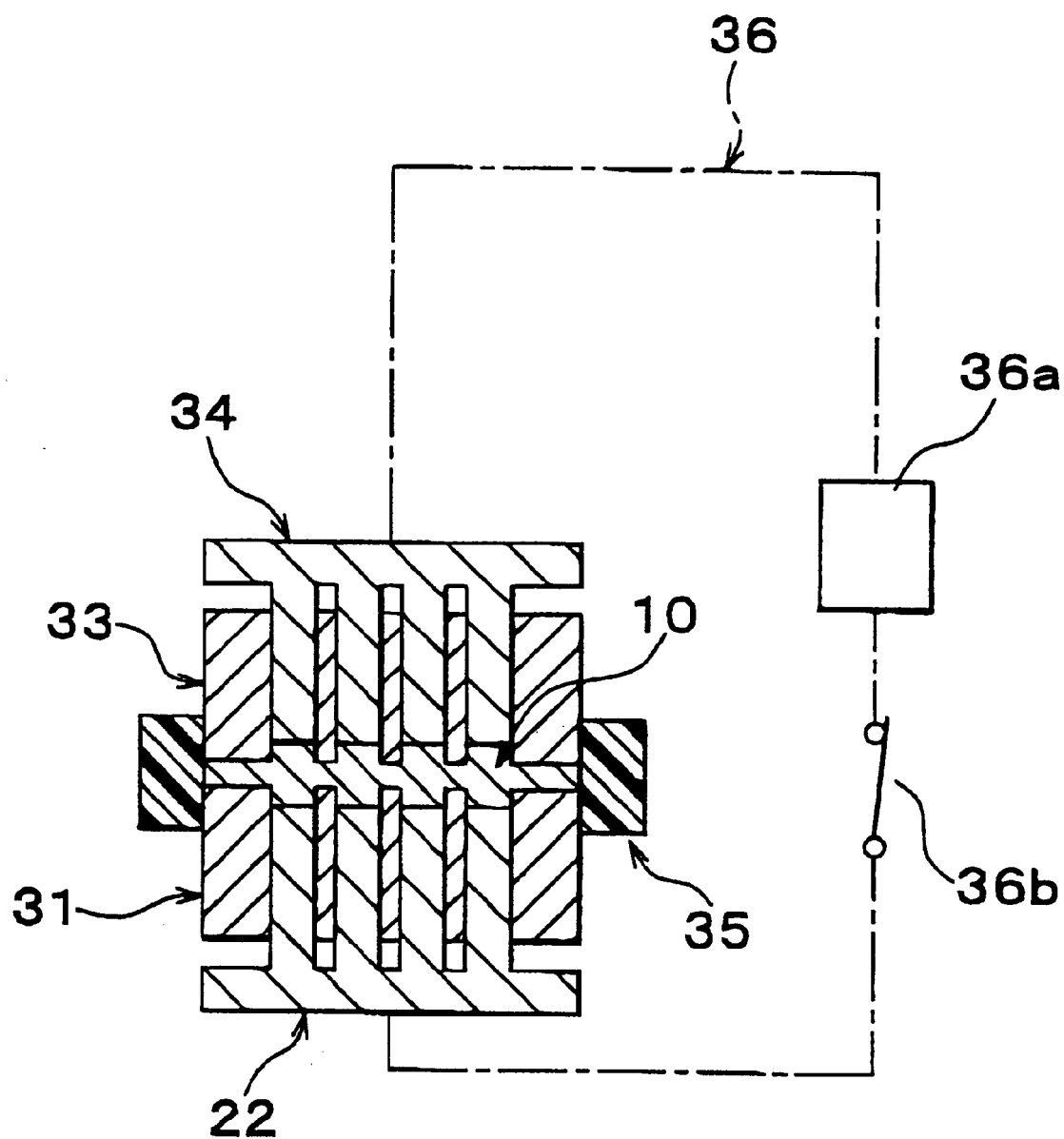
FIG. 10 is a schematic longitudinal sectional view showing a condition in which molding is completed with the same mold.

According to the fifth embodiment, first of all, prepared raw powder is loaded into the housing portion 37 in the mold 30 in a condition shown in FIG. 8 to attain a filling condition shown in FIG. 9. Next, the upper die 33 and the upper die punch 34 are descended into the housing portion 37, so that the raw powder 10a filled in the housing portion 37 is pressurized so as to carry out the molding. As a first stage, by carrying out preliminary pressurization without supplying a power, the raw powder 10a is compressed to about twice or four times the volume of the separator 10. After that, by closing the operating switch 36b of the power supplying circuit 36, current is supplied to the raw powder 10a filled in the housing portion 37. FIG. 10 shows a condition in which current is supplied to the raw powder 10a.

Consequently, current from the power supply 36a flows to the lower die punch 32 and lower die 31 of the mold 30, the raw powder 10a and the upper die 33 and the upper die punch 34, so that the current is applied to the raw powder 10a. As a result, Joule heat is generated by electric resistance in the raw powder 10a so that the raw powder 10a is heated up to a temperature which allows the binder resin to perform a thermosetting reaction. After confirming that the raw powder 10a has reached a thermosetting temperature of the binder, supplying power is stopped. Meanwhile, the current of the same magnitude is applied for the same period of time as the first to fourth embodiments. Consequently, the raw powder reaches a binder resin thermosetting temperature, for example, about 200° C.

Figure 11:
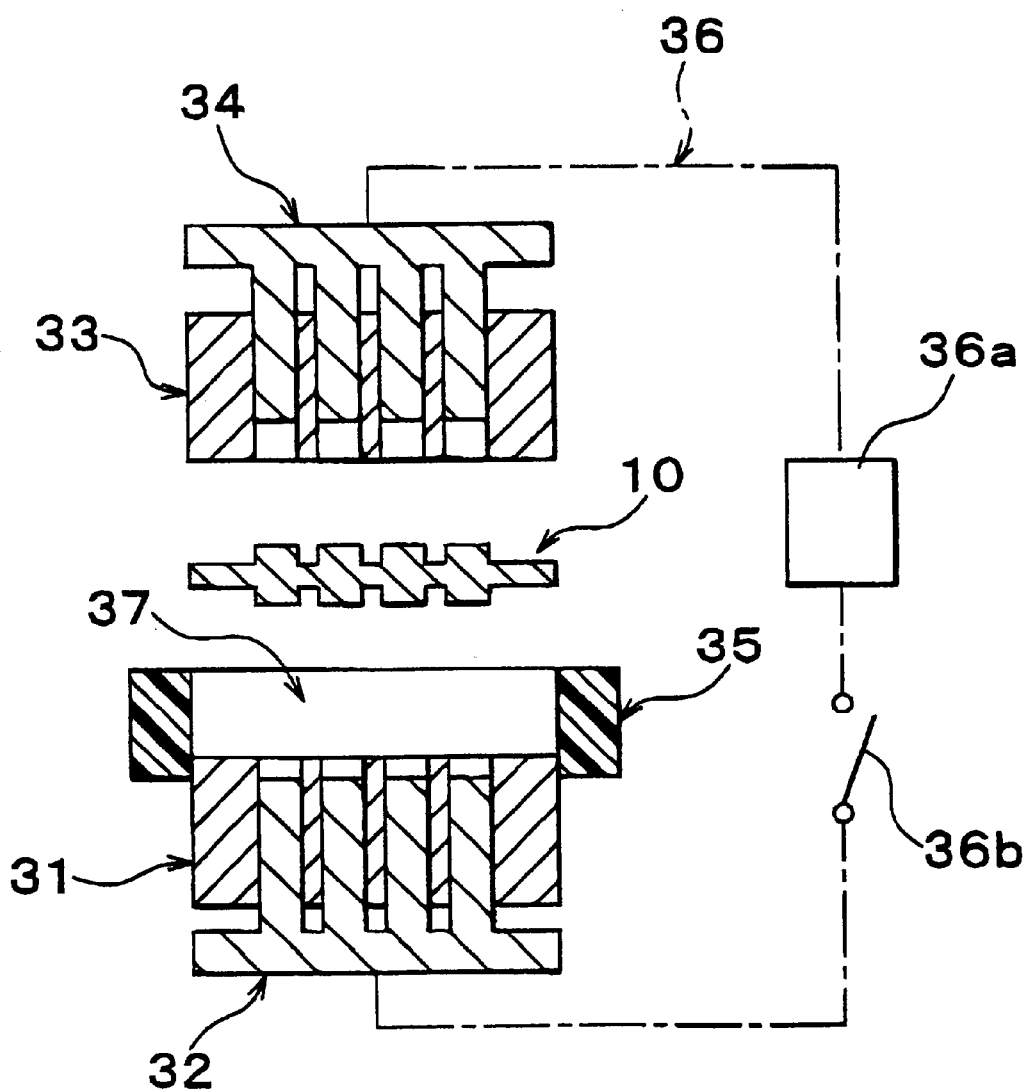
FIG. 11 is a schematic longitudinal sectional view showing a condition in which the separator of the same mold is released.

After that, the raw powder 10a is pressurized again so as to complete the molding with pressure. After the molding is completed, the upper die 33 and the upper die punch 34 are ascended up to the top dead center so as to release a molded separator 10. FIG. 11 shows a condition in which the separator 10 is released.

Although in the fifth embodiment, a step for heating the raw powder filled in the housing portion 27 of the mold 20 and a step for pressurizing the raw powder are carried out separately, the heating and pressurization of the raw powder 10a may be carried out at the same time. Further, the filled raw powder 10a may be pressurized temporarily and then heated after that.

According to the first to five embodiments, the separator for the fuel cell or the like can be provided by forming protruded portions of carbon rods integrally with the substrate within molds, works for forming the protruded portions of the carbon rods and for fitting those protruded portions into mounting holes in the substrate, which are required by the prior art, are abolished so as to form this type of the separator efficiently in a short time, and at a low cost.

What is claimed is:

1. A molding method for molding a conductive plate, comprising the steps of:
    preparing a substrate having through holes;
    preparing a mold having dies, at least one of dies including housing portions each having an opening opposing each through hole in the substrate;
    sandwiching the substrate between both dies of the mold such that each through hole corresponds to each housing portion of the die;
    filling each housing portion with raw powder through each through hole; and
    forming a plurality of protruded portions which are protruded at least in one direction of the substrate, by heating the raw powder under pressure.

2. A molding method according to claim 1, wherein;
    the substrate is a substrate made of synthetic resin, and
    the raw powder is a mixture of carbon powder with binder resin.

3. A molding method according to claim 2, wherein;
    the binder resin in the raw powder is thermosetting resin or thermoplastic resin.

4. A molding method according to claim 3, wherein;
    in the forming step, current is supplied to each raw powder filled in each housing portion located on at least one side of the substrate and the raw powder is heated with heat generated by resistance of the raw powder.

5. A molding method according to claim 4, wherein;
    the forming step includes
    a first pressurizing step of pressurizing the raw powder without supplying current to the raw powder;
    a current supplying step of raising a temperature of the raw powder to a predetermined temperature by supplying current to the raw powder pressurized in the first pressurizing step; and
    a second pressurizing step of pressurizing the raw powder, after the current supplying step, so as to form a plurality of protruded portions which are protruded in at least one direction integrally with the substrate.

6. A molding method according to claim 4, wherein;
    in the forming step
    the raw powder is heated and pressurized so as to form a plurality of protruded portions which are protruded in at least one direction, integrally with the substrate.

7. A molding method according to claim 4, wherein;
    the forming step includes:
    pressurizing step for pressurizing the raw powder to a predetermined final shape without current being supplied to the raw powder; and
    current supplying step for heating the raw powder to a predetermined temperature by supplying current to the raw powder pressurized in the pressurizing step.

8. A molding method according to claim 4, wherein;
    current is supplied to the raw powder filled in respective housing portions of the die in series connection.

9. A molding method according to claim 1, wherein;
    the diameter of the opening of each housing portion of the die is slightly larger than the diameter of the through hole in the substrate.

10. A molding method according to claim 1, wherein;
    the conductive plate is a fuel cell separator in which a plurality of protruded portions are provided on a single side or both sides of the substrate.

* * * * *